UNITED STATES PATENT OFFICE.

NATHANIEL WHEELER, OF BRIDGEPORT, CONNECTICUT.

IMPROVEMENT IN COMPOUNDS FOR FILLING THE GRAIN OF WOOD.

Specification forming part of Letters Patent No. 203,304, dated May 7, 1878; application filed February 21, 1878.

*To all whom it may concern:*

Be it known that I, NATHANIEL WHEELER, of Bridgeport, county of Fairfield, State of Connecticut, have discovered a new and useful Substance to be employed to Fill the Pores or Grains of Woods; and I hereby declare the following to be a full, clear, and exact description of my discovery and the method of its application.

The object of my discovery is to overcome the objections sometimes found in the use of finely-powdered silica, which was the subject of Letters Patent to me, January 18, 1876, No. 172,534, especially when woods were finished before manufacturing—such as organ and piano racks, clock-cases, and the like, because the filling dulled and destroyed the edge of saws and other tools used by the workmen.

I have found by experiments that ground Indian corn for this purpose is preferable to any of the articles heretofore used—such as corn-starch and similar soluble substances—for the reason that it has no glutinous or pasty qualities, such as are contained in flour, rice, and the like; it always remains in particles, no matter how finely pulverized, works freely, is easily applied and cleaned off, and forms a hard body when it sets.

I treat it as follows: Grind the corn—white being preferred on account of its transparency—so as to readily pass a sieve of one hundred meshes to the inch. Then mix it with sufficient linseed-oil and Japan varnish to form a thick paste, and regrind it quite fine.

Apply it in the ordinary manner, after being thinned by spirits of turpentine, so it will flow freely under a brush; and, as soon as set, rub it into the pores, and clean off the surface with cloth or excelsior shavings. It will presently dry hard, when it may be varnished or finished as desired, presenting a smooth and firm base, susceptible of high polish.

What I claim as my discovery, and desire to secure by Letters Patent, is—

A filler for the pores of wood composed of finely-ground Indian corn, linseed-oil, and Japan varnish, substantially as described.

NATHANIEL WHEELER.

Witnesses:
S. J. GORDON,
JOHN W. RIPLEY.